(12) United States Patent
Shimazawa (10) Patent No.: US 6,870,713 B2
(45) Date of Patent: Mar. 22, 2005

(54) MAGNETORESISTIVE EFFECT THIN-FILM MAGNETIC HEAD

(75) Inventor: Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 315 days.

(21) Appl. No.: 09/899,951

(22) Filed: Jul. 9, 2001

(65) Prior Publication Data

US 2002/0030948 A1 Mar. 14, 2002

(30) Foreign Application Priority Data

Jul. 10, 2000 (JP) ............................... 2000-208401

(51) Int. Cl.$^7$ .............................................. G11B 5/39
(52) U.S. Cl. ........................................................ 360/320
(58) Field of Search ............................. 360/319, 320, 360/321

(56) References Cited

U.S. PATENT DOCUMENTS

| | | | | |
|---|---|---|---|---|
| 3,848,217 A | * | 11/1974 | Lazzari | 360/319 |
| 3,996,095 A | * | 12/1976 | Ahn et al. | 360/131 |
| 4,195,323 A | * | 3/1980 | Lee | 360/319 |
| 4,477,319 A | * | 10/1984 | Abe et al. | 205/316 |
| 4,754,354 A | * | 6/1988 | Jeffers | 360/320 |
| 5,302,461 A | * | 4/1994 | Anthony | 360/320 |
| 5,436,777 A | * | 7/1995 | Soeya et al. | 360/327.1 |
| 5,668,688 A | * | 9/1997 | Dykes et al. | 360/324.1 |
| 5,726,837 A | * | 3/1998 | Nakatani et al. | 360/324.2 |
| 6,046,890 A | * | 4/2000 | Yamada et al. | 360/323 |
| 6,219,205 B1 | * | 4/2001 | Yuan et al. | 360/319 |

FOREIGN PATENT DOCUMENTS

| | | |
|---|---|---|
| JP | 04103014 | 4/1992 |
| JP | 11-213351 | 8/1999 |
| JP | 11-316919 | 11/1999 |

OTHER PUBLICATIONS

Accuratus Corporation, www.accuratus. com. Material Engineering Properties. pp. 1–10.*

W.P. Pratt, Jr. et al., "Perpendicular Giant Magnetoresistance of Ag/Co Multilayers", Physical Review Letters, vol. 66, No. 23, pp. 3060–3063, Jun. 10, 1991.

* cited by examiner

*Primary Examiner*—William Korzuch
*Assistant Examiner*—Christopher R. Magee
(74) *Attorney, Agent, or Firm*—Burns, Doane, Swecker & Mathis, L.L.P.

(57) ABSTRACT

An MR thin-film magnetic head includes a lower shield layer, an upper shield layer, a MR multilayer sandwiched between the lower shield layer and the upper shield layer, the MR multilayer being electrically connected with the lower shield layer and the upper shield layer, a current flowing through the MR multilayer in a direction perpendicular to surfaces of layers, and an insulation gap layer formed between the lower shield layer and the upper shield layer. At least a part of the insulation gap layer is made of an insulation material with a dielectric constant lower than that of $Al_2O_3$.

8 Claims, 9 Drawing Sheets

Fig. 12d  SiO₂

Fig. 13d  SiO₂

MAGNETORESISTIVE EFFECT THIN-FILM MAGNETIC HEAD

FIELD OF THE INVENTION

The present invention relates to a magnetoresistive effect (MR) thin-film magnetic head that is applicable to a hard disk drive (HDD) apparatus and provided with a tunnel magnetoresistive effect (TMR) element or a current perpendicular to the plane giant magnetoresistive effect (CPP-GMR) element, in which a current flows in a direction perpendicular to surfaces of layers.

DESCRIPTION OF THE RELATED ART

Recently, in order to satisfy the demand for higher recording density in an HDD apparatus, higher sensitivity and larger output of a thin-film magnetic head are required. A TMR element and a CPP-GMR element meet these requirements and are beginning to receive attention. The TMR element, disclosed in Japanese patent publication No. 04103014A for example, utilizes a ferromagnetic tunnel effect and has a multi-layered structure including a lower ferromagnetic thin-film layer, a tunnel barrier layer and an upper ferromagnetic thin-film layer. The CPP-GMR element is one type of GMR element of a multi-layered structure including a lower ferromagnetic thin-film layer, a nonmagnetic metal layer and an upper ferromagnetic thin-film layer. In the CPP-GMR element, however, a current flows in a direction perpendicular to the surfaces of laminated layers. Such CPP-GMR element is disclosed in, for example, W. P. Pratt, Jr. et al., "Perpendicular Giant Magnetoresistance of Ag/Co Multilayer," PHYSICAL REVIEW LETTERS, Vol. 66, No. 23, pp.3060–3063, June 1991.

These elements not only offer MR ratios several times greater than that of a general GMR element such as CIP (Current-In-Plane)-GMR element in which a current flows along the surface of layers, but also implements narrow gaps between layers without difficulty. The terms "lower" in "lower ferromagnetic thin-film layer" and "upper" in "upper ferromagnetic thin-film layer" are selectively used depending on the position of the layer relative to the substrate. In general, a layer is "lower" if this layer is close to the substrate, and "upper" if the layer is away from the substrate.

Figure 1:
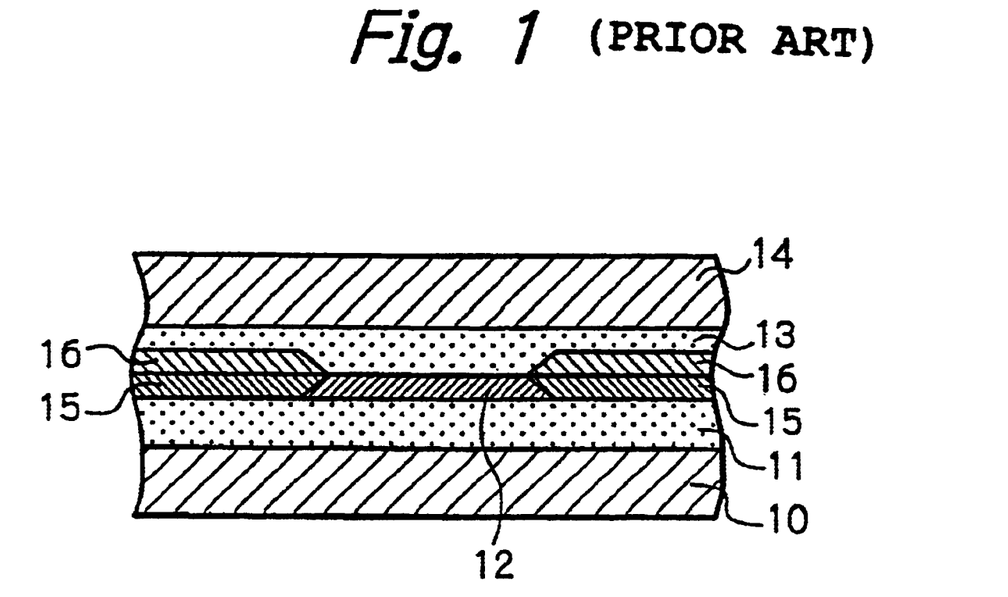
FIG. 1 already disclosed shows a sectional view illustrating a CIP-GMR element with a conventional structure seen from a direction of ABS.

FIG. 1 illustrates a CIP-GMR element with a conventional structure seen from an air bearing surface (ABS).

In the figure, reference numeral 10 denotes a lower shield layer, 11 denotes a lower shield gap layer made of an insulation material, 12 denotes a GMR multilayer consisting of a lower ferromagnetic thin-film layer (free layer)/a non-magnetic metal layer/an upper ferromagnetic thin-film layer (pinned layer)/an anti-ferromagnetic thin-film layer, 13 denotes an upper shield gap layer formed of an insulation material, 14 denotes an upper shield layer, 15 denotes hard bias layers, and 16 denotes electrode layers, respectively.

A sense current flows in parallel to the surfaces of the layers of the GMR multilayer 12. The GMR multilayer 12 are insulated from the lower shield layer 10 by the lower shield gap layer 11, and from the upper shield layer 14 by the upper shield gap layer 13.

In order to more narrow the gap of such CIP-GMR element, the lower and upper shield gap layers 11 and 13 require to be formed of a very thin insulating material with a very high dielectric strength. However, such an insulating material is difficult to make and has been the bottleneck for providing a CIP-GMR element used in a high density HDD apparatus.

Figure 2:
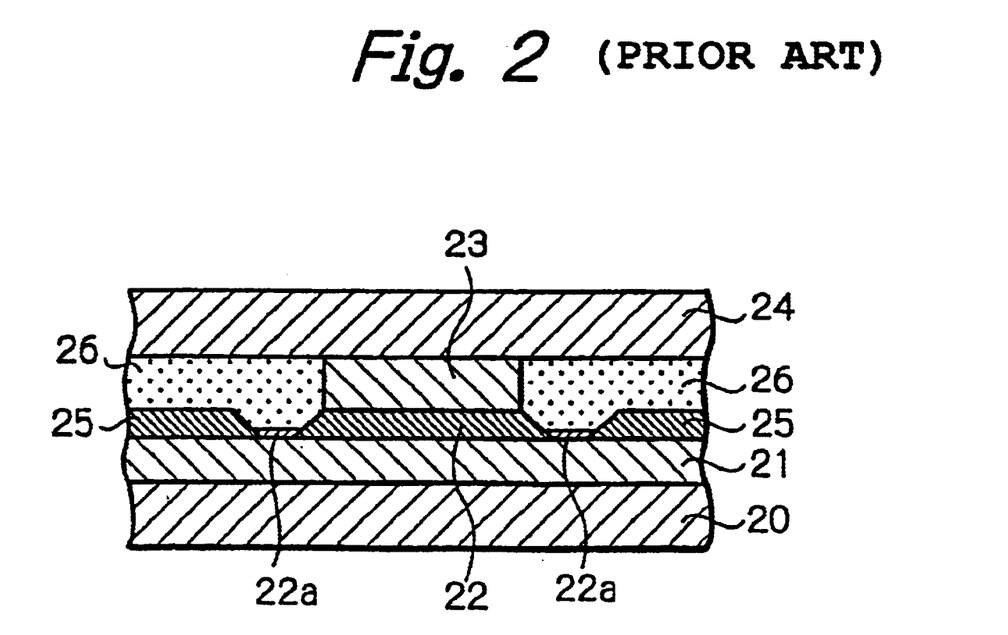
FIG. 2 already disclosed shows a sectional view illustrating a TMR element or a CPP-GMR element with a conventional structure seen from a direction of ABS.

FIG. 2 illustrates a TMR element or a CPP-GMR element with a conventional structure, seen from the ABS.

In the figure, reference numeral 20 denotes a lower shield layer also serving as an electrode, 21 denotes a lower gap layer made of a metal material, which also serves as an electrode, 22 denotes a TMR layer with a multi-layered structure consisting of a lower ferromagnetic thin-film layer (free layer)/a tunnel barrier layer/an upper ferromagnetic thin-film layer (pinned layer)/an anti-ferromagnetic thin-film layer, or CPP-GMR layer with a multi-layered structure consisting of a lower ferromagnetic thin-film layer (free layer)/a nonmagnetic metal layer/an upper ferromagnetic thin-film layer (pinned layer)/an anti-ferromagnetic thin-film layer, 23 denotes an upper gap layer made of a metal material, which also serves as an electrode, 24 denotes an upper shield layer also serving as an electrode, 25 denotes hard bias layers, and 26 denotes an insulation gap layer made of an insulating material, respectively. Reference numeral 22a denotes extended parts of the lower ferromagnetic thin-film layer (free layer) extending from the TMR multilayer or the CPP-GMR multilayer to the hard bias layers 25 along the surfaces of layers of the TMR multilayer or the CPP-GMR multilayer.

The TMR element or CPP-GMR element is electrically connected between the lower shield layer 20 and the upper shield layer 24 so that a sense current flows in a direction perpendicular to the surfaces of the layers. Therefore, a narrow gap can be implemented without inviting dielectric breakdown of the gap layer. As a result, the line recording density can be greatly improved.

The important features required for an HDD apparatus are not only high recording density but also high data transfer rate. The transfer rate greatly relies on the rotational speed of a magnetic disk as well as the frequency characteristics of a write head and a read head.

Figure 3:
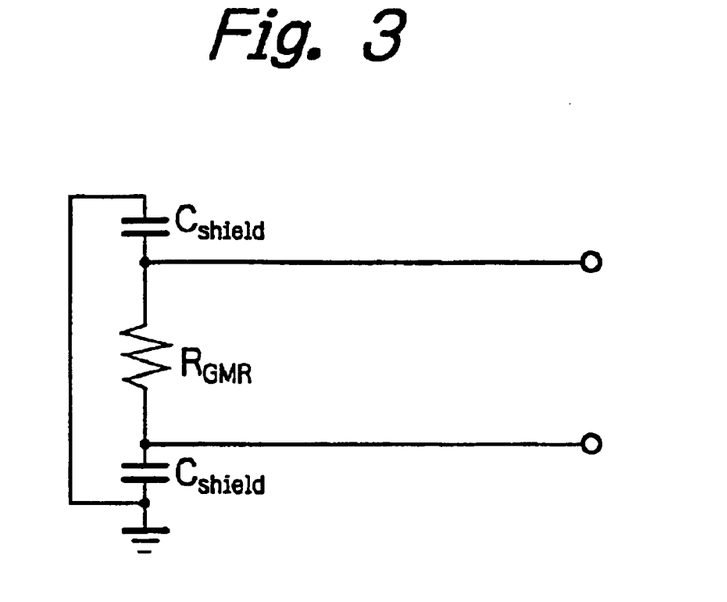
FIG. 3 already disclosed shows an equivalent circuit diagram of the CIP-GMR element.
Figure 4:
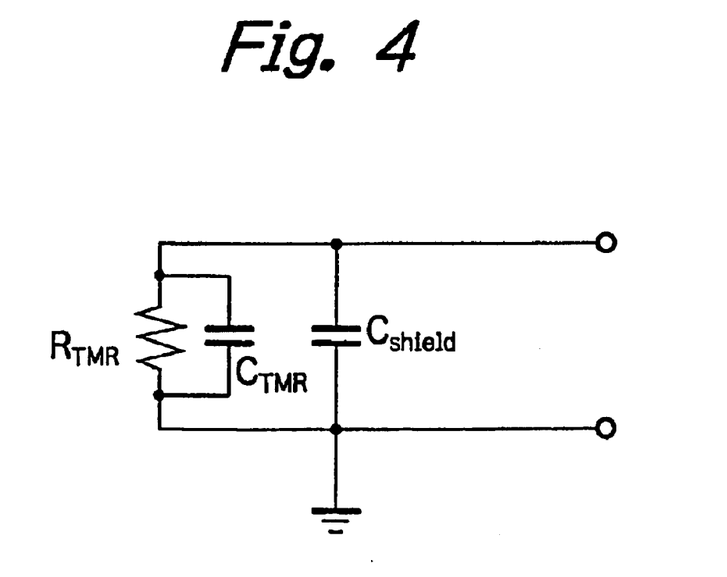
FIG. 4 already disclosed shows an equivalent circuit diagram of the TMR element or the CPP-GMR element.

FIG. 3 shows an equivalent circuit of the CIP-GMR element, and FIG. 4 shows an equivalent circuit of the TMR element or the CPP-GMR element.

As is apparent from FIG. 3, the CIP-GMR element has only an equivalent resistance $R_{GMR}$ of the GMR element across the output terminals and no other essential factor that may deteriorate its frequency characteristics. However, as shown in FIG. 4, the TMR element or the CPP-GMR element that utilizes the shield layers as the electrodes has not only an equivalent resistance $R_{TMR}$ of the TMR element or the CPP-GMR element across their output terminals but also a capacitance $C_{shield}$ between the shield layers and a capacitance $C_{TMR}$ of the TMR element or the CPP-GMR element itself across their output terminals. These resistance $R_{TMR}$ and capacitances $C_{TMR}$ and $C_{shield}$ form a low-pass filter causing serious deterioration of the frequency characteristics.

SUMMARY OF THE INVENTION

It is therefore an object of the present invention to provide an MR thin-film magnetic head having a TMR element or a CPP-GMR element for example, whereby the frequency characteristics of the MR thin-film magnetic head can be greatly improved.

According to the present invention, an MR thin-film magnetic head includes a lower shield layer, an upper shield layer, a MR multilayer sandwiched between the lower shield layer and the upper shield layer, the MR multilayer being electrically connected with the lower shield layer and the upper shield layer, a current flowing through the MR multilayer in a direction perpendicular to surfaces of layers, and an insulation gap layer formed between the lower shield layer and the upper shield layer. At least a part of the insulation gap layer is made of an insulation material with a dielectric constant lower than that of $Al_2O_3$.

Also, according to the present invention, an MR thin-film magnetic head includes a lower shield layer, a lower gap layer made of a nonmagnetic electrically conductive material and laminated on the lower shield layer, an MR multilayer in which a current flows in a direction perpendicular to surfaces of layers of the MR multilayer, the MR multilayer being formed on the lower gap layer, an upper gap layer made of a nonmagnetic electrically conductive material and formed on the MR multilayer, an insulation gap layer formed to surround the MR multilayer and the upper gap layer, and an upper shield layer laminated on the upper gap layer and the insulation gap layer. At least a part of the insulation gap layer is made of an insulation material with a dielectric constant lower than that of $Al_2O_3$.

Since at least a part of the insulation gap layer formed between the lower shield layer and the upper shield layer is made of an insulation material with a dielectric constant lower than that of $Al_2O_3$, the capacitance $C_{shield}$ between the lower shield layer and the upper shield layer decreases. As a result, the frequency characteristics of the thin-film magnetic head is greatly improved.

Figure 5:
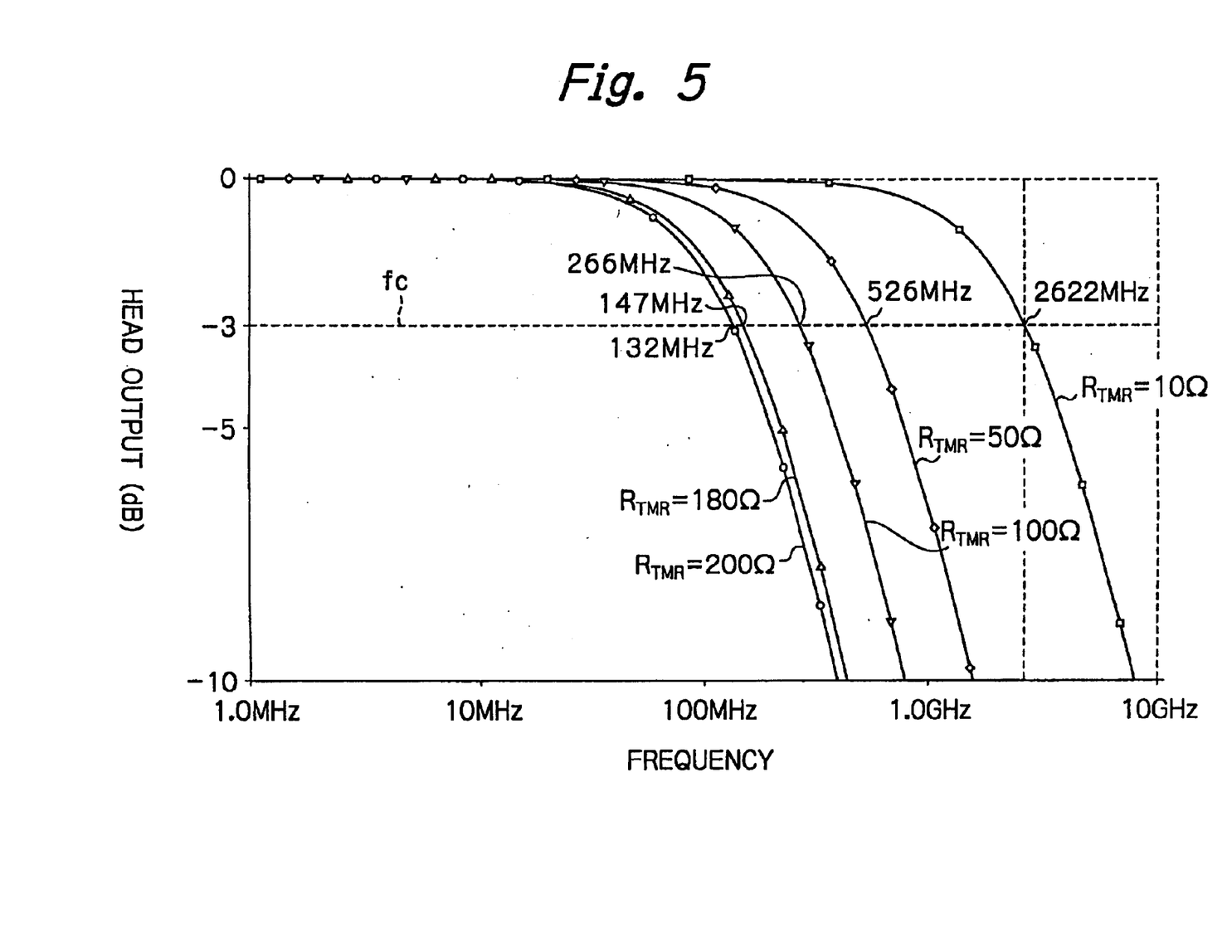
FIG. 5 already disclosed illustrates an attenuation versus frequency characteristic when the capacitance $C_{shield}$ between the shield layers in the equivalent circuit of FIG. 4 is 6 pF.
Figure 6:
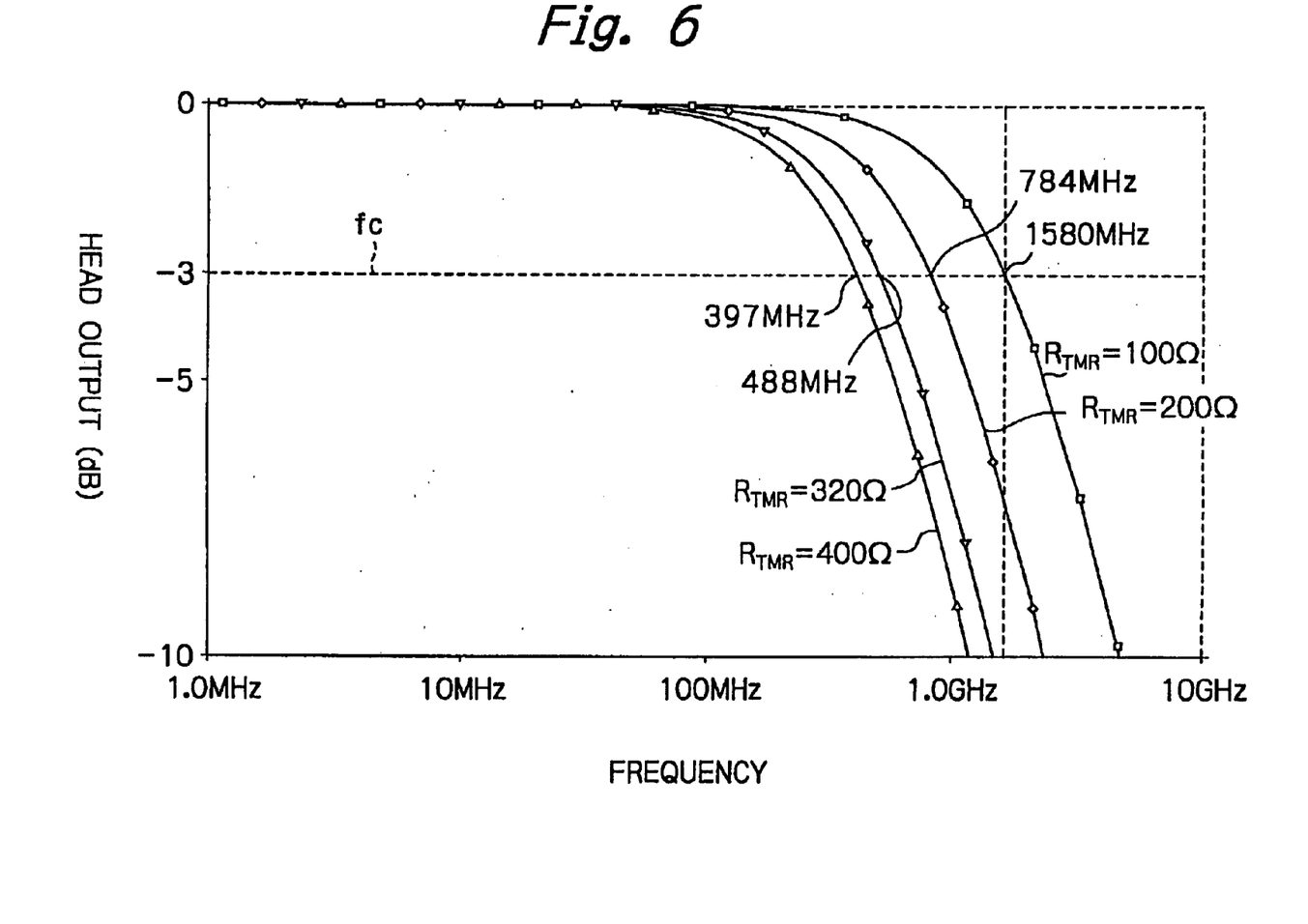
FIG. 6 already disclosed illustrates an attenuation versus frequency characteristic when the capacitance $C_{shield}$ between the shield layers in the equivalent circuit of FIG. 4 is 1 pF.

FIG. 5 illustrates a head output versus frequency characteristic when the capacitance $C_{shield}$ between the shield layers in the equivalent circuit of FIG. 4 is 6 pF, and FIG. 6 illustrates a head output versus frequency characteristic when the capacitance $C_{shield}$ between the shield layers in the equivalent circuit of FIG. 4 is 1 pF. It is assumed that the capacitance $C_{TMR}$ of the TMR element or CPP-GMR element itself is 0.01 pF and the load connected across the output terminals is 10 MΩ.

As will be understood from FIG. 5, when the capacitance $C_{shield}$ between the shield layers is 6 pF, the cut-off frequency fc at which the output decreases by 3 dB decreases as the resistance $R_{TMR}$ increases. In order to achieve fc>500 MHz, the resistance $R_{TMR}$ should be less than 50 Ω. This frequency of 500 MHz is an expected frequency to be used at a record density of about 100 Gbits/in². For TMR or CPP-GMR elements with a recording density of 100 Gbits/in² or more, it is very difficult to implement such a low resistance value.

Contrary to this, as shown in FIG. 6, when the capacitance $C_{shield}$ between the shield layers is 1 pF, even if the resistance $R_{TMR}$ is higher than 300 Ω, the cut-off frequency fc can be fc>500 MHz. For the resistance $R_{TMR}$ higher than 300 Ω that is a sufficiently realizable value, the frequency characteristic of the thin-film magnetic head can be greatly improved by making the capacitance $C_{shield}$ between the shield layers smaller. The capacitance $C_{TMR}$ of the TMR element or CPP-GMR element itself is much smaller than the capacitance $C_{shield}$ between the shield layers (less than one tenth), and therefore can be of little or no problem.

It is preferred that all of the insulation gap layer is made of an insulation material with a dielectric constant lower than that of $Al_2O_3$.

It is also preferred that the insulation material with a dielectric constant lower than that of $Al_2O_3$ is $Si_3N_4$, Co-$\gamma Fe_2O_3$ or $SiO_2$.

The MR multilayer is preferably a TMR multilayer including a tunnel barrier layer and a pair of ferromagnetic thin-films between which the tunnel barrier is sandwiched, or a CPP-GMR multilayer including a nonmagnetic metal layer, and a pair of ferromagnetic thin-films between which the nonmagnetic metal layer is sandwiched.

Further objects and advantages of the present invention will be apparent from the following description of preferred embodiments of the invention as illustrated in the accompanying drawings.

DESCRIPTION OF THE PREFERRED EMBODIMENTS

Figure 7:
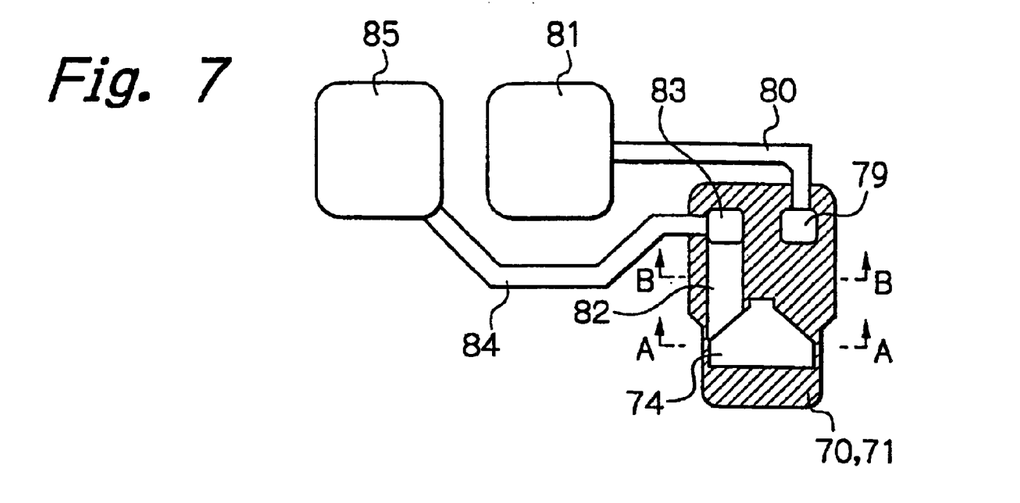
FIG. 7 shows a plane view schematically illustrating, as a preferred embodiment according to the present invention, a configuration of a lower shield layer, an upper shield layer and lead conductors of a TMR thin-film magnetic head.
Figure 8:
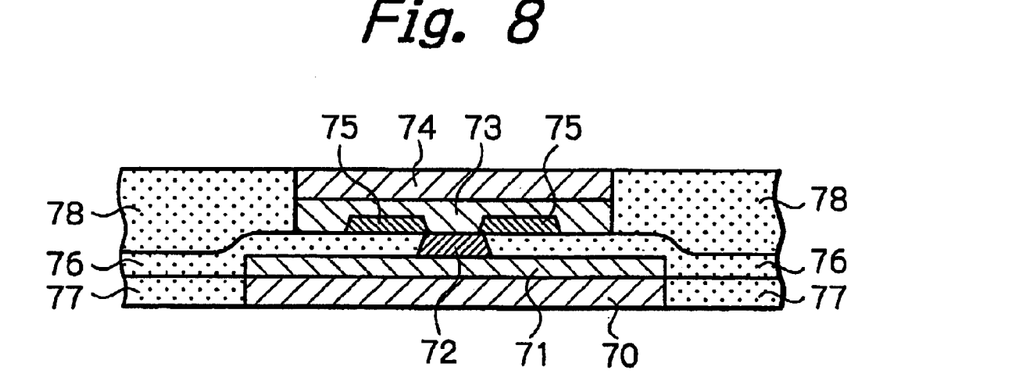
FIG. 8 shows an A—A line sectional view of FIG. 7.
Figure 9:
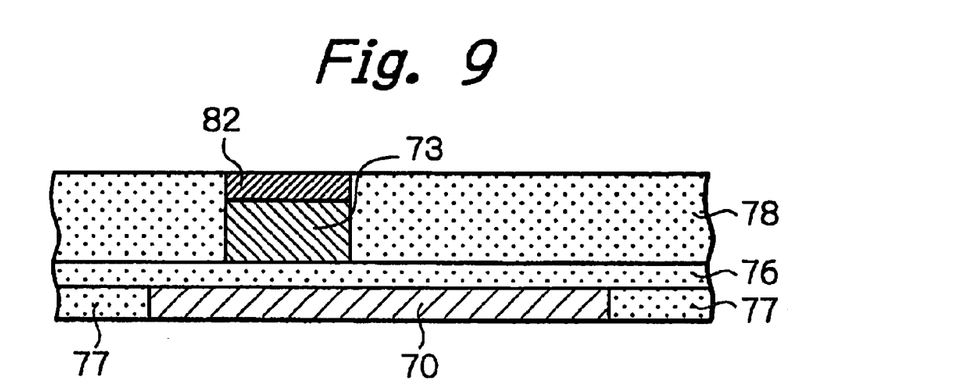
FIG. 9 shows a B—B line sectional view of FIG. 7.

FIG. 7 schematically illustrates an outline of the configuration of a lower shield layer, an upper shield layer, and lead conductors of a TMR thin-film magnetic head before MR height or throat height polishing as a preferred embodiment according to the present invention, FIG. 8 illustrates an A—A line section of FIG. 7, and FIG. 9 illustrates a B—B line section of FIG. 7.

In FIG. 7, only the lower shield layer, the upper shield layer, the lead conductors connected to the lower shield layer and upper shield layer, and terminal electrodes are shown, but the rest of the structure are omitted. In FIGS. 8 and 9, layers laminated on the upper surface of the upper shield layer are omitted.

Referring to these figures, reference numeral 70 denotes a lower shield layer also serving as an electrode, laminated on a substrate, not shown, 71 denotes a lower gap layer serving also as an electrode, made of a nonmagnetic electrically conductive material, that is laminated on the lower shield layer 70 and is electrically connected with the lower shield layer 70, 72 denotes a TMR multilayer laminated on the lower gap layer 71 and patterned, 73 denotes an upper gap layer also serving as an electrode, made of a nonmagnetic electrically conductive material, this upper gap layer being laminated at least on the TMR multilayer 72, 74 denotes an upper shield layer also serving as an electrode, that is laminated on the upper gap layer 73 and is electrically connected with the upper gap layer 73, 75 denotes hard bias layers for providing a bias magnetic field for magnetic domain control, 76 denotes an insulation gap layer made of an insulating material, that is formed on the lower gap layer 71 and outside of the TMR multilayer 72, 77 denotes a first insulation layer formed outside of the lower shield layer 70, and 78 denotes a second insulation layer formed on the insulation gap layer 76 outside of the upper gap layer 73 and the upper shield layer 74, respectively.

In FIG. 7, furthermore, reference numeral 79 denotes a first via hole conductor, one end of which is electrically connected to the lower shield layer 70 or the lower gap layer 71, 80 denotes a first lead conductor, one end of which is electrically connected to the other end of the first via hole conductor 79, 81 denotes a first terminal electrode (connection pad) to which the other end of the first lead conductor 80 is electrically connected, 82 denotes a second lead conductor, one end of which is electrically connected to the upper shield layer 74, 83 denotes a second via hole conductor, one end of which is electrically connected to the other end of the second lead conductor 82, 84 denotes a third lead conductor, one end of which is electrically connected to the other end of the second via hole conductor 83, and 85 denotes a second terminal electrode (connection pad) to which the other end of the third lead conductor 84 is electrically connected, respectively.

The TMR multilayer 72 has a multi-layered structure including at least essential layers such as an anti-ferromagnetic thin-film layer, a lower ferromagnetic thin-film layer (pinned layer), a tunnel barrier layer and an upper ferromagnetic thin-film layer (free layer), not shown in the figure.

The upper ferromagnetic thin-film layer (free layer) is formed basically such that the direction of magnetization freely changes depending upon an applied external magnetic field. The lower ferromagnetic thin-film layer (pinned layer) is formed such that the direction of magnetization is fixed to a desired orientation according to an exchange coupling bias magnetic field between the lower ferromagnetic thin-film layer and the anti-ferromagnetic thin-film layer.

The lower shield layer 70 and the upper shield layer 74 are formed in a single layer structure or a multilayer structure of, for example, NiFe (permalloy), sendust, CoFe, CoFeNi or CoZrNb. A film thickness is in the range of 0.5 to 4 $\mu$m, preferably 1 to 3 $\mu$m.

The lower gap layer 71 and the upper gap layer 73 are made of a nonmagnetic electrically conductive material such as Ta, Cu, Al, Ag, Au, Ti, TiW, Rh, Cr, In, Ir, Mg, Ru, W, Zn, PtMn or RuRhMn, or alloys of these materials. A film thickness is in the range of 5 to 70 nm, preferably 10 to 50 nm.

The lower ferromagnetic thin-film layer (pinned layer) and the upper ferromagnetic thin-film layer (free layer) of the TMR multilayer 72 are preferably made of a high spin polarization material, and are formed in a single layer structure or a multilayer structure of, for example, Fe, Co, Ni, CoFe, NiFe, CoZrNb or CoFeNi. The lower ferromagnetic thin-film layer (pinned layer) has a thickness in the range of 1 to 10 nm, preferably 2 to 5 nm. Too large thickness of the pinned layer weakens the exchange coupling bias magnetic field between this layer and the anti-ferromagnetic thin-film layer, and too small thickness reduces TMR ratio. A thickness of the upper ferromagnetic thin-film layer (free layer) is in the range of 2 to 50 nm, preferably 4 to 30 nm. If the thickness of the free layer is too large, the output of the head decreases and becomes unstable due to, for example, Barkhausen noise. If the thickness is too small, the output decreases due to the deterioration of TMR effect.

The tunnel barrier layer of the TMR multilayer 72 is made of, for example, $Al_2O_3$, NiO, GdO, MgO, $Ta_2O_5$, $MoO_2$, $TiO_2$ or $WO_2$. A thickness of the tunnel barrier layer is in the range of about 0.5 to 2 nm. In order to make a low-resistance element, the thickness of the tunnel barrier layer should be as small as possible. However, too thin layer is not desirable because it may cause pinholes which in turn cause leakage current.

The anti-ferromagnetic thin-film layer of the TMR multilayer 72 is made of, for example, PtMn or RuRhMn but other common anti-ferromagnetic materials may be used. A thickness is in the range of about 6 to 30 nm.

A part of or entirety of the insulation gap layer 76 is made of an insulation materials such as $Si_3N_4$, $Co$-$\gamma Fe_2O_3$ (maghemite) or $SiO_2$ that has a lower dielectric constant than $Al_2O_3$. The first insulation layer 77 and the second insulation layer 78 are usually made of $Al_2O_3$. However, the first insulation layer 77 and the second insulation layer 78 may be made of the same insulation material as that of the insulation gap layer 76.

The first and second via hole conductors 79 and 83, the first, second and third lead conductors 80, 82 and 84, and the first and second terminal electrodes (connection pads) 81 and 85 are made of, for example, Cu, Al, Au or Ag. The second lead conductor 82, one end of which is electrically connected to the upper shield layer 74 may be formed of the same material as that of the upper shield layer 74.

An important aspect of this embodiment is that a part of or entirety of the insulation gap layer 76 is made of $Si_3N_4$, $Co$-$\gamma Fe_2O_3$ (maghemite) or $SiO_2$. Such insulation material has a lower dielectric constant than $Al_2O_3$ and therefore a dielectric constant of the dielectric material sandwiched between the lower gap layer 71 and the upper gap layer 73 and of the dielectric material sandwiched between the upper gap layer and the lower shield layer 70 under the second lead conductor 82 and the second via hole conductor 83. As a result, the capacitance $C_{shield}$ between the lower and upper shield layers 70 and 74 is reduced to extremely improve the frequency characteristics of the thin-film magnetic head.

If the whole of the insulation gap layer 76 is made of $Al_2O_3$ with a relative dielectric constant of $\epsilon_r=7$, the capacitance $C_{shield}$ between the lower shield layer 70 and the upper shield layer 74 becomes $C_{shield}=10.2$ pF and the cut-off frequency fc becomes fc=120 MHz. In this case, the area S of the conductor or electrode having the potential of the upper shield layer 74 and located above the lower shield layer 70 or the lower gap layer 71, in other words the area serving as electrode of a capacitance is S=10230 $\mu m^2$ (calculated by CAD). The distance between the lower shield layer 70 and the upper shield layer 74 is 110 nm. Of which, the film thickness of the insulation layer is 52 nm, and the resistance $R_{HGA}$ of the TMR head including the leads is $R_{HGA}$=130 Ω. The measured values and calculated values of the capacitance $C_{shield}$ and the cut-off frequency fc are in fairly good agreement. For example, the cut-off frequency fc can be calculated from fc=1/(2π$R_{HGA}C_{shield}$).

If the whole of the insulation gap layer 76 is made of Co-γFe$_2$O$_3$ (maghemite) with a relative dielectric constant of $\epsilon_r$=3.5, the frequency characteristics of the thin-film magnetic head can be more greatly improved as $C_{shield}$=5.1 pF and fc=240 MHz.

If the whole of the insulation gap layer 76 is made of SiO$_2$ with a relative dielectric constant of $\epsilon_r$=3, the frequency characteristics of the thin-film magnetic head can be extremely improved as $C_{shield}$=4.4 pF and fc=278 MHz.

Figure 10:
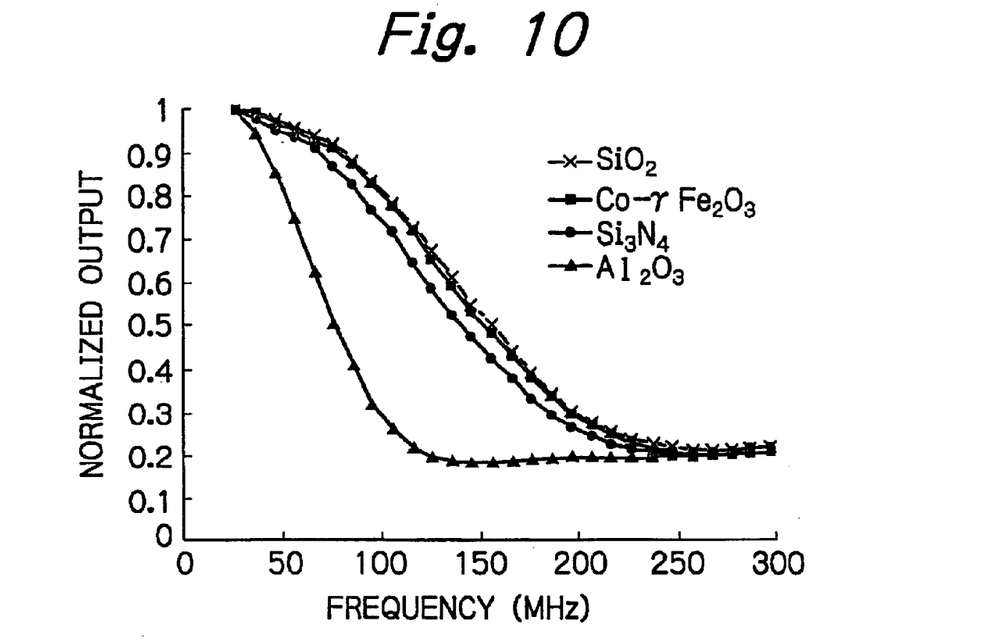
FIG. 10 illustrates measured head output versus frequency characteristics of actually fabricated TMR heads provide with the similar structure as in the embodiment shown in FIGS. 7 to 9 and with the insulation gap layer made of different insulation materials.
Figure 11:
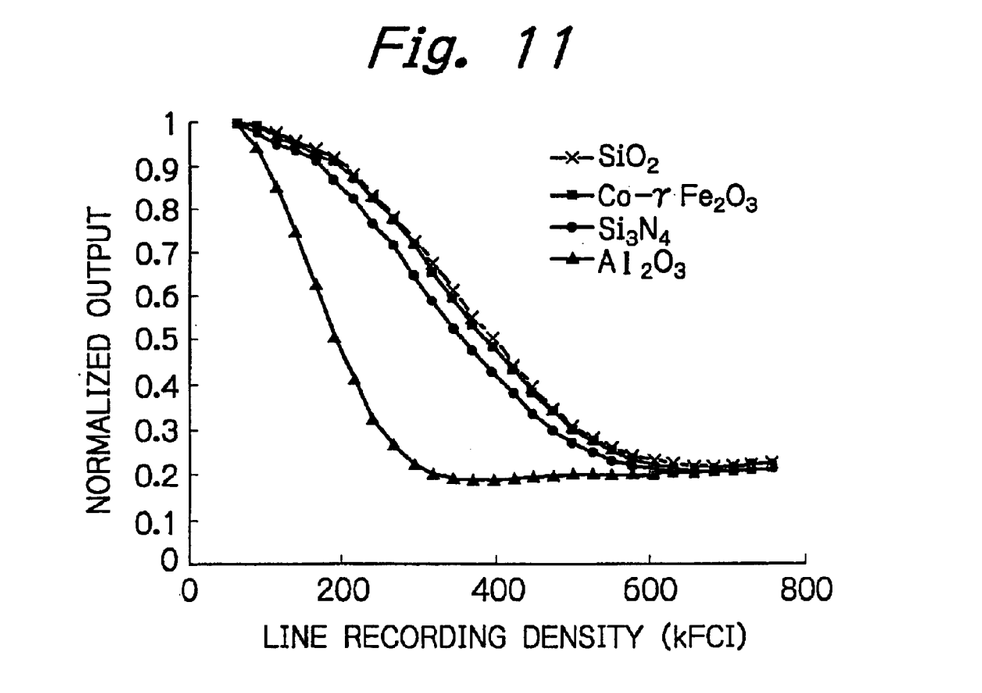
FIG. 11 illustrates calculated line recording density versus frequency characteristic derived from the characteristic shown in FIG. 10.
Figure 12A:
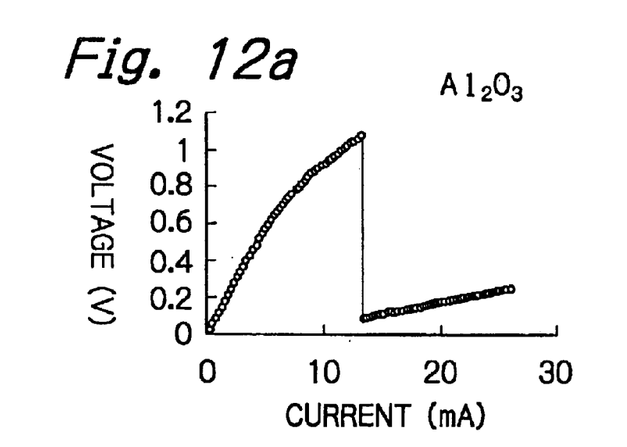
FIGS. 12a to 12d illustrate the measured results of an over current at which the TMR head is electrically broken.
Figure 12B:
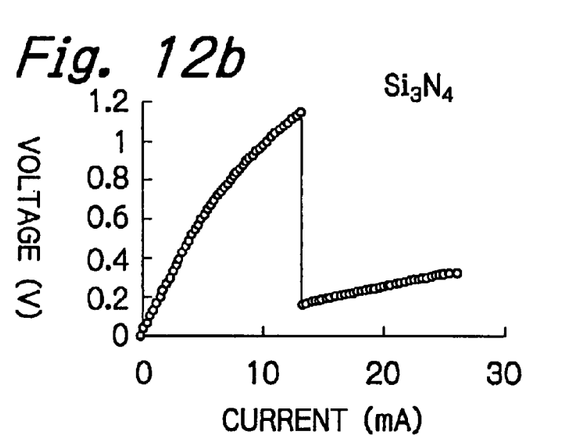
Figure 12C:
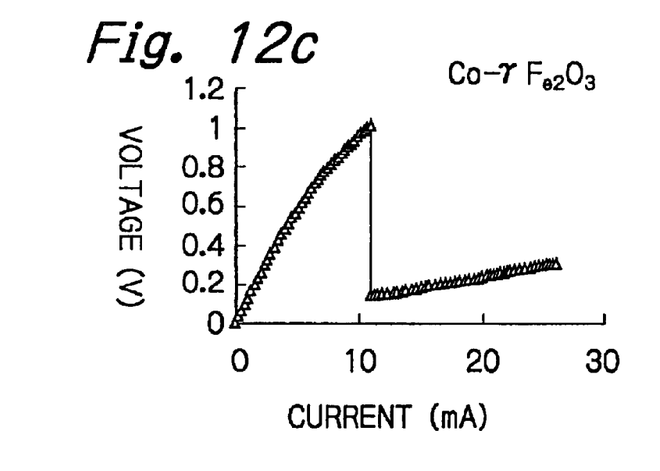
Figure 12D:
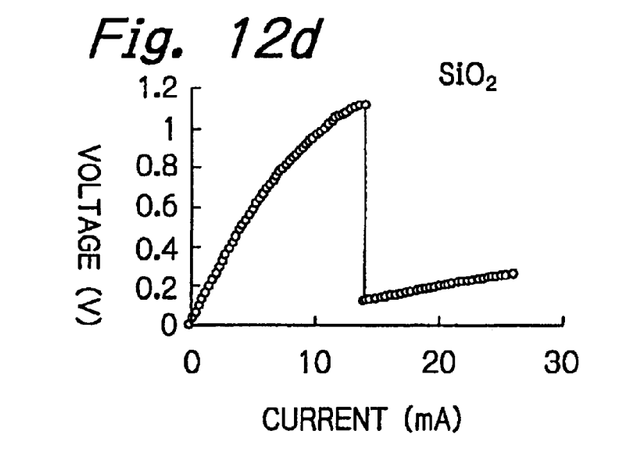
Figure 13A:
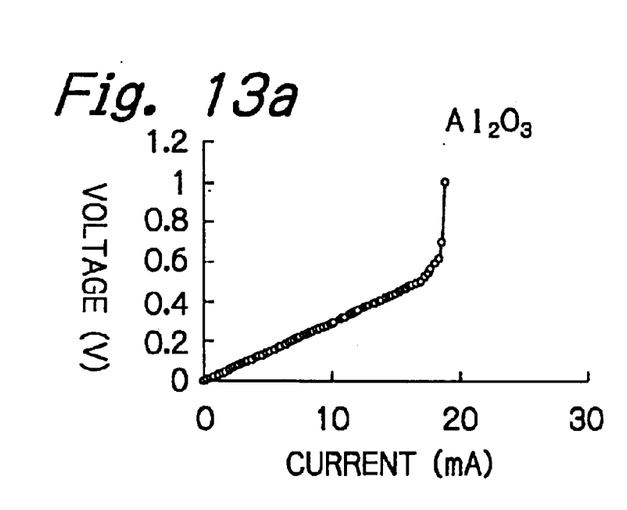
FIGS. 13a to 13d illustrate the measured results of an over current at which the CPP-GMR head is electrically broken.
Figure 13B:
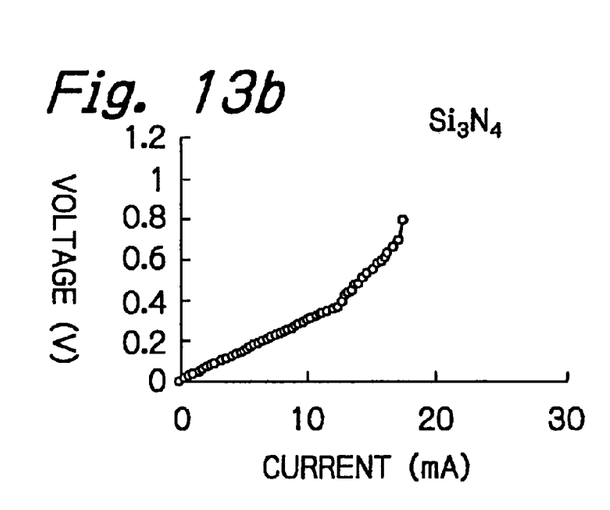
Figure 13C:
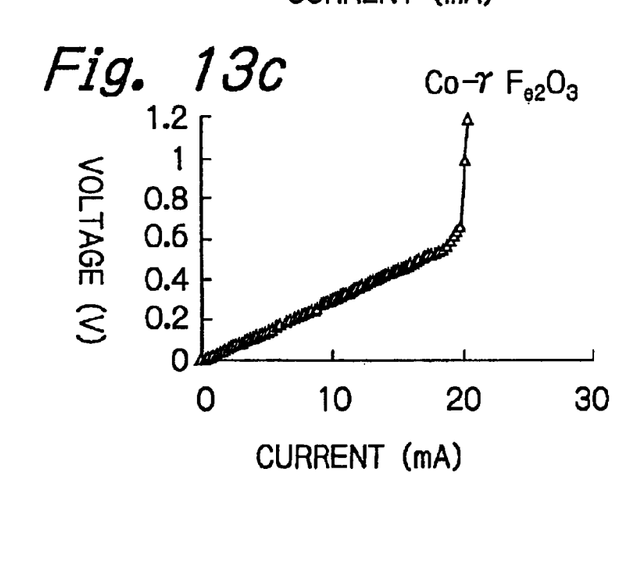
Figure 13D:
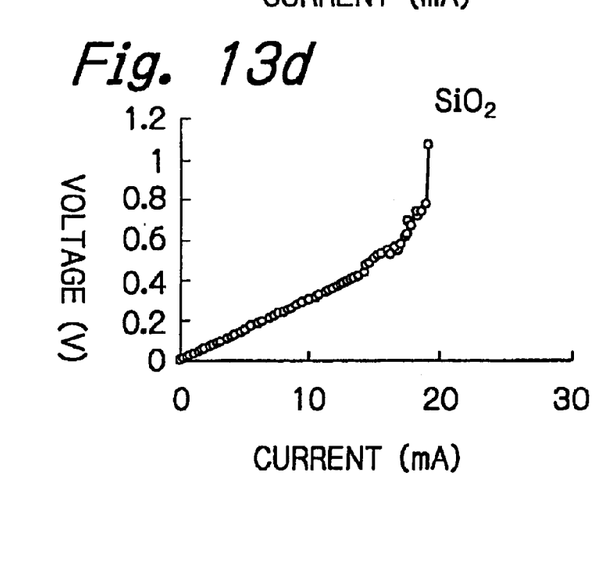

FIG. 10 illustrates measured head output versus frequency characteristics of actually fabricated TMR heads provide with the similar structure as in this embodiment and with the insulation gap layer made of different insulation materials, and FIG. 11 illustrates calculated line recording density versus frequency characteristic derived from the characteristic shown in FIG. 10.

Each actually fabricated TMR head sample had a TMR multilayer of a laminated structure of NiCr (3 nm) as an under layer, PtMn (14 nm) as an anti-ferromagnetic thin-film layer, CoFe (2 nm)/Ru (0.8 nm)/CoFe (2 nm) as a lower ferromagnetic thin-film layer (pinned layer), AlO$_x$ as a tunnel barrier layer, CoFe (2 nm)/NiFe (4 nm) as an upper ferromagnetic thin-film layer (free layer), and NiCr (3 nm) as a cap layer, all of which are sequentially laminated in this order. With respect to the TMR multilayer, a dimension was 0.35×0.35 $\mu m^2$, RA was 15 Ω$\mu m^2$, the distance between the shield layers was 110 nm, the film thickness of the insulation gap layer 76 was 52 nm, and the resistance of TMR head including leads was $R_{HGA}$=130 Ω. With a magnetic disk rotating at a speed of 5400 rpm, the frequency characteristic of the TMR head was tested with different recording frequencies, the test being carried out at a position of a radius r=35 mm.

As is apparent from FIGS. 10 and 11, if the whole of the insulation gap layer 76 is formed by Si$_3$N$_4$, Co-γFe$_2$O$_3$ or SiO$_2$, the capacitance $C_{shield}$ has decreased from $C_{shield}$=10.2 pF of the conventional art where the insulation gap layer is formed by Al$_2$O$_3$ to 5.8 pF, 5.1 pF or 4.4 pF. This improves the frequency characteristic of the head greatly. In addition, the D50 value has also improved greatly from 194 kFCI in the conventional art to 364 kFCI, 397 kFCI or 398 kFCI.

Instead of all of the insulation gap layer 76, only a part of the insulation gap layer 76, for example only a region of the insulation gap layer 76, which will affects to the capacitance between the shield layers, a part of this region or a part of the insulation gap layer 76 along a direction of its thickness, may be formed by Si$_3$N$_4$, Co-γFe$_2$O$_3$ or SiO$_2$ to reasonably decrease the capacitance $C_{shield}$ and to reasonably increase the cut-off frequency fc.

Although the capacitance $C_{shield}$ can be decreased and thus the frequency characteristics of the head can be improved by using such insulation materials having a lower dielectric constant than Al$_2$O$_3$ for the insulation gap layer 76, there is apprehension that a withstand current at this insulation gap layer may be decreased. Thus, TMR heads provided with the above-mentioned structure and with the insulation gap layer 76 made of different insulation materials were actually fabricated and break down current values at which the TMR heads are electrically broken due to over current were measured.

FIGS. 12a to 12d indicate the measured results. In case of FIG. 12a where the insulation gap layer 76 is made of Al$_2$O$_3$, the head is broken at a current of 13.3 mA. In case of FIG. 12b where the insulation gap layer 76 is made of Si$_3$N$_4$, the head is broken at a current of 13.0 mA. In case of FIG. 12c where the insulation gap layer 76 is made of Co-γFe$_2$O$_3$, the head is broken at a current of 10.7 mA. In case of FIG. 12d where the insulation gap layer 76 is made of SiO$_2$, the head is broken at a current of 14.1 mA.

It can be understood from these measured results that destructive currents are not dependent on the material of the insulation gap layer 76 but are substantially constant. This means that electrical destruction in the TMR head will occur at the TMR multilayer 72 before the destruction at the insulation gap layer 76. Therefore, a practical withstand current at the insulation gap layer 76 is not decreased and reliability of the head will not be lowered even if such insulation materials having a lower dielectric constant than Al$_2$O$_3$ for the insulation gap layer 76.

Hereinafter, a modification using a CPP-GMR multilayer in which a sense current flows perpendicular to a plane of laminated layers instead of the TMR multilayer will be described.

An example of the CPP-GMR multilayer has a multilayered structure including at least essential layers such as a first anti-ferromagnetic thin-film layer, a first ferromagnetic thin-film layer (first pinned layer), a first nonmagnetic metal layer made of Cu for example, a second ferromagnetic thin-film layer (free layer), a second nonmagnetic metal layer made of Cu for example, a third ferromagnetic thin-film layer (second pinned layer) and a second anti-ferromagnetic thin-film layer, not shown in the figure.

The second ferromagnetic thin-film layer (free layer) is formed basically such that the direction of magnetization freely changes depending upon an applied external magnetic field. The first and third ferromagnetic thin-film layers (first and second pinned layers) are formed such that the direction of magnetization is fixed to a desired orientation according to exchange coupling bias magnetic fields between these first and third ferromagnetic thin-film layers and the respective first and second anti-ferromagnetic thin-film layers.

The layer structure and other configurations in this modification except for the CPP-GMR multilayer are quite the same as those in the embodiment of FIGS. 7 to 9. Thus, detail description of other configurations in this modification is omitted. Layer structure of the CPP-GMR multilayer is not limited to the above-mentioned modification, but any layer structure can be used for the CPP-GMR multilayer.

In a CPP-GMR head having the similar structure as the above-mentioned modification, if the whole of the insulation gap layer 76 is made of Al$_2$O$_3$ with a relative dielectric constant of $\epsilon_r$=7, the capacitance $C_{shield}$ between the lower shield layer 70 and the upper shield layer 74 becomes $C_{shield}$=10.2 pF and the cut-off frequency fc becomes fc=520 MHz. In this case, the area S of the conductor or electrode having the potential of the upper shield layer 74 and located above the lower shield layer 70 or the lower gap layer 71, in other words the area serving as electrode of a capacitance is S=10230 $\mu m^2$ (calculated by CAD). The distance between the lower shield layer 70 and the upper shield layer 74 is 110 nm. Of which, the film thickness of the insulation layer is 52 nm, and the resistance $R_{HGA}$ of the CPP-GMR head including the leads is $R_{HGA}$=30 Ω. The measured values and calculated values of the capacitance $C_{shield}$ and the cut-off frequency fc are in fairly good agreement. For example, the cut-off frequency fc can be calculated from $fc=1/(2\pi R_{HGA}C_{shield})$.

If the whole of the insulation gap layer 76 is made of $Si_3N_4$ with a relative dielectric constant of $\epsilon_r=4$, the frequency characteristics of the thin-film magnetic head can be greatly improved as $C_{shield}=5.8$ pF and fc=915 MHz.

If the whole of the insulation gap layer 76 is made of Co-$\gamma Fe_2O_3$ (maghemite) with a relative dielectric constant of $\epsilon_r=3.5$, the frequency characteristics of the thin-film magnetic head can be more greatly improved as $C_{shield}=5.1$ pF and fc=1.04 GHz.

If the whole of the insulation gap layer 76 is made of $SiO_2$ with a relative dielectric constant of $\epsilon_r=3$, the frequency characteristics of the thin-film magnetic head can be extremely improved as $C_{shield}=4.4$ pF and fc=1.21 GHz.

In order to check a withstand current at the insulation gap layer 76 in this CPP-GMR head, CPP-GMR heads provided with the above-mentioned structure and with the insulation gap layer 76 made of different insulation materials were actually fabricated and break down current values at which the CPP-GMR heads are electrically broken due to over current were measured.

The actually fabricated CPP-GMR head had CPP-GMR multilayer of a laminated structure of NiCr (3 nm) as an under layer, PtMn (14 nm) as a first anti-ferromagnetic thin-film layer, CoFe (2 nm)/Ru (0.8 nm)/CoFe (2 nm) as a first ferromagnetic thin-film layer (first pinned layer), Cu (2.2 nm) as a first nonmagnetic metal layer, CoFe (1 nm)/NiFe (2 nm)/CoFe (1 nm) as a second ferromagnetic thin-film layer (free layer), Cu (2.2 nm) as a second nonmagnetic metal layer, CoFe (2 nm)/Ru (0.8 nm)/CoFe (2 nm) as a third ferromagnetic thin-film layer (second pinned layer), PtMn (14 nm) as a second anti-ferromagnetic thin-film layer and NiCr (3 nm) as a cap layer, all of which are sequentially laminated in this order. For the CPP-GMR multilayer, a dimension was 0.1×0.03 $\mu m^2$, the distance between the shield layers was 110 nm, the film thickness of the insulation gap layer 76 was 52 nm, and the resistance of CPP-GMR head including leads was $R_{HGA}=30 \Omega$.

FIGS. 13a to 13d indicate the measured results. In case of FIG. 13a where the insulation gap layer 76 is made of $Al_2O_3$, the head is broken at a current of 18.7 mA. In case of FIG. 13b where the insulation gap layer 76 is made of $Si_3N_4$, the head is broken at a current of 17.4 mA. In case of FIG. 13c where the insulation gap layer 76 is made of Co-$\gamma Fe_2O_3$, the head is broken at a current of 20.2 mA. In case of FIG. 13d where the insulation gap layer 76 is made of $SiO_2$, the head is broken at a current of 19.3 mA.

It can be understood from these measured results that destructive currents are not dependent on the material of the insulation gap layer 76 but are substantially constant. This means that electrical destruction in the CPP-GMR head will occur at the CPP-GMR multilayer before the destruction at the insulation gap layer 76. Therefore, a practical withstand current at the insulation gap layer 76 is not decreased and reliability of the head will not be lowered even if such insulation materials having a lower dielectric constant than $Al_2O_3$ for the insulation gap layer 76.

Figure 14:
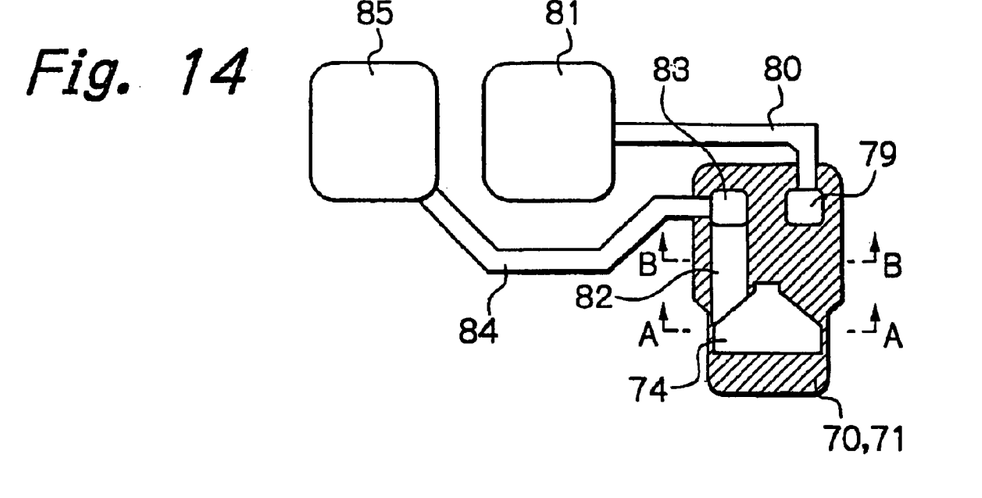
FIG. 14 shows a plane view schematically illustrating, as another embodiment according to the present invention, a configuration of a lower shield layer, an upper shield layer and lead conductors of a TMR thin-film magnetic head.
Figure 15:
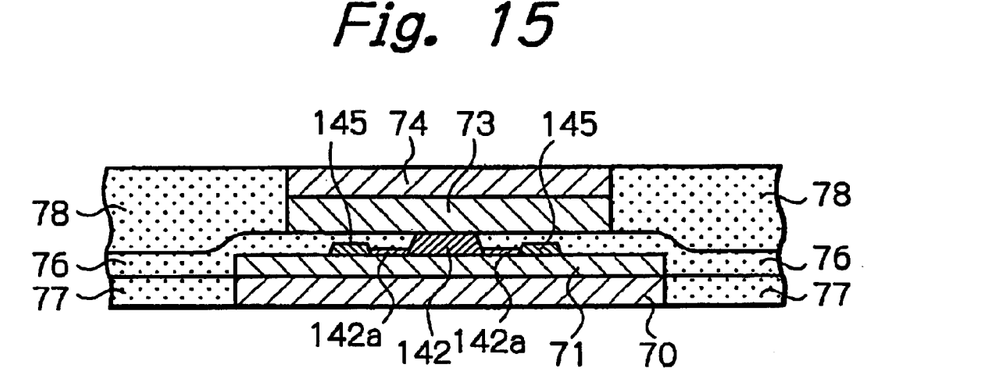
FIG. 15 shows an A—A line sectional view of FIG. 14.
Figure 16:
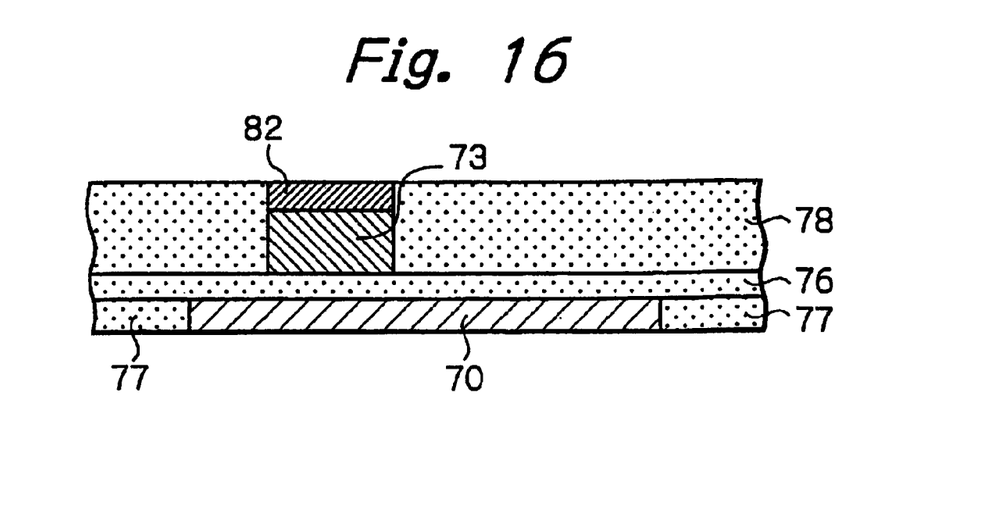
FIG. 16 shows a B—B line sectional view of FIG. 14.

FIG. 14 schematically illustrates an outline of the configuration of a lower shield layer, an upper shield layer, and lead conductors of a TMR thin-film magnetic head before MR height or throat height polishing as another embodiment according to the present invention, FIG. 15 illustrates an A—A line section of FIG. 14, and FIG. 16 illustrates a B—B line section of FIG. 14.

In FIG. 14, only the lower shield layer, the upper shield layer, the lead conductors connected to the lower shield layer and upper shield layer, and terminal electrodes are shown, but the rest of the structure are omitted. In FIGS. 15 and 16, layers laminated on the upper surface of the upper shield layer are omitted.

This embodiment differs from the embodiment of FIGS. 7 to 9 in the structure of a TMR multilayer 142 and hard bias layers 145 that are patterned and formed on the lower gap layer 71. The other structure of this embodiment is exactly the same as that of the embodiment of FIGS. 7 to 9. Thus, in these figures, elements similar to those in FIGS. 7 to 9 are given the same reference numerals.

The TMR head of the embodiment of FIGS. 14 to 16 has TMR multilayer 142 of multi-layered structure with basic layers of a lower ferromagnetic thin-film layer (free layer), a tunnel barrier layer, an upper ferromagnetic thin-film layer (pinned layer) and an anti-ferromagnetic thin-film layer, all of which are sequentially laminated in this order on the lower gap layer 71. The hard bias layers 145 are also laminated on the lower gap layer 71. Reference numeral 142a shown in FIG. 15 denotes extended parts of the lower ferromagnetic thin-film layer (free layer) extending from the TMR multilayer 142 to the hard bias layers 145 along the surfaces of layers of the TMR multilayer.

The other configuration, material, film thickness, effects and advantages, and modifications in this embodiment are the same as those in the embodiment shown in FIGS. 7 to 9.

As for a modification of this embodiment shown in FIGS. 14 to 16, a CPP-GMR multilayer in which a sense current flows in a direction perpendicular to the surfaces of layers may be used instead the TMR multilayer.

In the aforementioned embodiments and modifications, if the second lead conductor 82 and the second via hole conductor 83 are patterned so that an area of them, opposing the lower shield layer 70 or the lower gap layer 71 becomes small, the capacitance $C_{shield}$ between the shield layers is reduced to improve the frequency characteristics of the thin-film magnetic head.

Further, the insulation gap layer 76 may have a larger film thickness than that in the aforementioned embodiments and modifications. This can be realized by increasing the film thickness of the TRM multilayer 72 or 142 or the CPP-GMR multilayer itself, or by increasing the film thickness of the lower gap layer 71 only within a region of the TMR multilayer 72 or 142 or of the CPP-GMR multilayer. Thus, the capacitance $C_{shield}$ between the shield layers can be more reduced and the frequency characteristic of the thin-film magnetic head can be improved.

Still further, a distance between the lower shield layer and the upper shield layer can be substantially increased from that in the aforementioned embodiments and modifications to further reduce the capacitance $C_{shield}$ between the shield layers and thus to improve the frequency characteristic of the thin-film magnetic head. This can be realized by removing the upper surface portion of the lower shield layer 70 to form a recess within a region where the TMR multilayer 72 or 142 or the CPP-GMR multilayer is absent and by filling the recess with an insulation layer, or by partially adding an insulation layer on the insulation gap layer 76.

While the aforementioned embodiments and modifications have been described with respect to two types of TMR multilayer or CPP-GMR multilayer, the present invention can be applied to TMR elements or CPP-GMR elements with any structures.

Many widely different embodiments of the present invention may be constructed without departing from the spirit and scope of the present invention. It should be understood that the present invention is not limited to the specific embodiments described in the specification, except as defined in the appended claims.

What is claimed is:

1. A magnetoresistive effect thin-film magnetic head, comprising:
    a lower shield layer;
    an upper shield layer;
    a magnetoresistive effect multilayer in which a current flows in a direction perpendicular to surfaces of layers of said magnetoresistive effect multilayer, said magnetoresistive effect multilayer being formed between said lower shield layer and said upper shield layer, and being electrically connected with said lower shield layer and said upper shield layer; and
    an insulation gap layer formed between said lower shield layer and said upper shield layer, at least a part of said insulation gap layer being made of Co-$\gamma$Fe$_2$O$_3$.

2. The magnetoresistive effect thin-film magnetic head as claimed in claim 1, wherein all of said insulation gap layer is made of Co-$\gamma$Fe$_2$O$_3$.

3. The magnetoresistive effect thin-film magnetic head as claimed in claim 1, wherein said magnetoresistive effect multilayer is a tunnel magnetoresistive effect multilayer including a tunnel barrier layer and a pair of ferromagnetic thin-film layers between which said tunnel barrier layer is sandwiched.

4. The magnetoresistive effect thin-film magnetic head as claimed in claim 1, wherein said magnetoresistive effect multilayer is a current perpendicular to the plane giant magnetoresistive effect multilayer including a nonmagnetic metal layer, and a pair of ferromagnetic thin-film layers between which said nonmagnetic metal layer is sandwiched.

5. A magnetoresistive effect thin-film magnetic head, comprising:
    a lower shield layer;
    a lower gap layer made of a nonmagnetic electrically conductive material and laminated on said lower shield layer;
    a magnetoresistive effect multilayer in which a current flows in a direction perpendicular to surfaces of layers of said magnetoresistive effect multilayer, said magnetoresistive effect multilayer being laminated on said lower gap layer;
    an upper gap layer made of a nonmagnetic electrically conductive material and laminated on said magnetoresistive effect multilayer;
    an insulation gap layer formed around said magnetoresistive effect multilayer and said upper gap layer, at least a part of said insulation gap layer being made of Co-$\gamma$Fe$_2$O$_3$; and
    an upper shield layer laminated on said upper gap layer and said insulation gap layer.

6. The magnetoresistive effect thin-film magnetic head as claimed in claim 5, wherein all of said insulation gap layer is made of Co-$\gamma$Fe$_2$O$_3$.

7. The magnetoresistive effect thin-film magnetic head as claimed in claim 5, wherein said magnetoresistive effect multilayer is a tunnel magnetoresistive effect multilayer including a tunnel barrier layer and a pair of ferromagnetic thin-film layers between which said tunnel barrier layer is sandwiched.

8. The magnetoresistive effect thin-film magnetic head as claimed in claim 5, wherein said magnetoresistive effect multilayer is a current perpendicular to the plane giant magnetoresistive effect multilayer including a nonmagnetic metal layer, and a pair of ferromagnetic thin-film layers between which said nonmagnetic metal layer is sandwiched.

* * * * *